(12) United States Patent
Yukawa et al.

(10) Patent No.: US 7,250,861 B2
(45) Date of Patent: Jul. 31, 2007

(54) CRIME-PREVENTION LIGHTING DEVICE (75) Inventors: Akira Yukawa, Otsu (JP); Tadashi Sugimoto, Otsu (JP); Hiroyuki Tomooka, Otsu (JP); Hisato Takemura, Otsu (JP); Akihiko Hayashi, Otsu (JP)

(73) Assignee: Optex Co., Ltd., Shiga (JP)

( * ) Notice: Subject to any disclaimer, the term of this patent is extended or adjusted under 35 U.S.C. 154(b) by 0 days.

(21) Appl. No.: 10/522,135

(22) PCT Filed: Jul. 17, 2003

(86) PCT No.: PCT/JP03/09118

§ 371 (c)(1),
(2), (4) Date: Jan. 24, 2005

(87) PCT Pub. No.: WO2004/012164

PCT Pub. Date: Feb. 5, 2004

(65) Prior Publication Data

US 2005/0212443 A1  Sep. 29, 2005

(30) Foreign Application Priority Data

Jul. 25, 2002  (JP) .............................. 2002-216064

(51) Int. Cl.
*G08B 13/00* (2006.01)
(52) U.S. Cl. ........................... 340/541; 315/133
(58) Field of Classification Search ................ 340/541, 340/524, 550; 315/133
See application file for complete search history.

(56) References Cited

U.S. PATENT DOCUMENTS 5,442,177 A    8/1995  Boulos et al.
5,781,108 A *  7/1998  Jacob et al. ................ 340/552
6,127,926 A * 10/2000  Dando ........................ 340/541
6,204,762 B1 * 3/2001  Dering et al. ............... 340/541
2002/0067259 A1* 6/2002  Fufidio et al. .............. 340/541
2003/0156027 A1* 8/2003  Seo ............................ 340/523
2003/0193393 A1* 10/2003  Ford ........................... 340/506
2004/0036603 A1* 2/2004  Bingham ..................... 340/541

FOREIGN PATENT DOCUMENTS

| CN | 1107272 | 8/1995 |
| GB | 2 326 008 A | 12/1998 |
| JP | 57-144188 | 9/1982 |
| JP | 64-3992 | 1/1989 |
| JP | 2001/143876 A | 5/2001 |
| JP | 2001-273569 A | 10/2001 |
| JP | 2003/339301 A | 12/2003 |

OTHER PUBLICATIONS

Chinese Office Action for application No. 03817393X, issued Nov. 24, 2006.

* cited by examiner

*Primary Examiner*—Don Wong
*Assistant Examiner*—Angela M Lie
(74) *Attorney, Agent, or Firm*—Sughrue Mion, PLLC (57) ABSTRACT

To provide a security lighting apparatus of a kind capable of easily optimizing the timing at which an alert is carried out, when a human body is detected by a human body detector 1 during the time zone determined by a time zone setting device (19), an alert is issued to an intruder entering within any one of detection zones (A1 to A4) and, accordingly, the timing at which the alert is initiated during the time zone can be easily and properly set.

7 Claims, 6 Drawing Sheets

CRIME-PREVENTION LIGHTING DEVICE

This is a National Stage entry of Application PCT/JP03/09118, with an international filing date of Jul. 17, 2003, which was published under PCT Article 21(2) as WO 2004/012164 A1, and the complete disclosure of which is incorporated into this application by reference.

BACKGROUND OF THE INVENTION

1. Field of the Invention

The present invention relates to a security lighting apparatus of a kind capable of emitting a blinking light (hereinafter referred to as a "flashing light") within a detection area outside a building such as, for example, a dwelling house or a factory for alert against an intruder, in the event that during the nighttime an unauthorized entry of the intruder into the detection area is detected. More particularly, the present invention relates to optimization of the timing at which the flashing light is triggered on or off.

2. Description of the Prior Art

The security system has been well known, in which in the event that an unauthorized entry of a human being is detected during the nighttime within the detection area outside a building such as, for example, a dwelling house or a factory, a security light is turned on continuously for a predetermined length of time, or a flashing light, i.e., a mode of lighting in which lighting and extinction are cyclically repeated, is triggered at the intruder at late night for alert purpose. By way of example, the Japanese Laid-open Utility Model Publication No. 7-29691 discloses the use of a timer, which is activated in response to detection of an intruder and to switch from the continuous lighting for illumination purpose to the flashing for alert purpose depending on the set-up of the timer. Also, depending on the time period in the nighttime after sunset, the continuous lighting and the flashing can be manually selected one at a time.

With the security lighting apparatus, it is generally considered important to set the timing at which the flashing is initiated at night, depending on change of status of return of a house resident from his or her outing and/or neighboring road conditions. If the flashing starts too early, the flashing intended for the purpose of alert a potential intruder would be unpleasant and/or obnoxious for non-intruders, for example, house residents. On the other hand, if the flashing starts too late, the alert effect of the flashing would not be brought about.

The prior art security lighting apparatus of the kind disclosed in the above mentioned publication is so designed and so constructed that in the event of detection of a human being, the flashing is carried out according to the schedule preset in the timer regardless of whether the human being is an intruder or whether he or she is a non-intruder. Accordingly, where the human being so detected is a non-intruder such as, for example, a house resident, it often occurs that when meeting with the flashing, the non-intruder will feel annoying.

Considering that the hour of sunrise and the hour of sunset vary depending on the season and/or the geographic conditions of the building, the timing at which the flashing is to be initiated generally varies as well. In the case where the security lighting apparatus has a capability of manually selecting one of the continuous lighting and the flashing, setting of the initiating timing at which the security lighting apparatus is activated, i.e., the continuous lighting or the flashing is initiated, based on the length of time passed subsequent to the sunset would require the house resident to ascertain the hour of sunset on a case-by-case basis and, hence, this is indeed complicated and cumbersome.

Also, since the continuous lighting taking place before sunset and the flashing taking place before sunrise serve no purpose since the ambience is light-filled, the initiating timing and the terminating timing have to be properly set and, therefore, complicated and cumbersome procedures are required to accomplish the proper setting of the initiating and terminating timings in consideration of the change required for each season.

SUMMARY OF THE INVENTION

In view of the foregoing, the present invention has been devised to substantially eliminate the above discussed problems and inconveniences and is intended to provide a security lighting apparatus of a kind capable of easily optimizing the timing at which an alert is carried out.

In order to accomplish the above described object, the present invention provides a security lighting apparatus, which includes a human body detector for detecting a human body within a detection area, an illuminator for illuminating the detection area when a human body is detected, a time period setting device for setting a specific time period during which a security check must be made, and an alert device operable, when the human body is detected during the specific time period, to issue an alert or threatening to an intruder entering the detection area.

According to the present invention, in the event that the human body is detected by the human body detector during the specific time period defined by the time period setting device, an alert is issued to an intruder entering the detection area and, accordingly, the timing at which the alert is issued can easily and properly be set as a result of the time period set for security purpose.

Preferably, the alert means can issue the alert by repeatedly turning the illuminator on and off. Alternatively, the alert means may issue the alert in the form of sounds or in the form of a combination of blinking of the illuminator and sounds. In such case, an effective alert can be issued to the intruder.

Also preferably, the time period setting device may include a sunset detecting unit for detecting sunset, a start time setting unit for setting a start time of the specific time period for security check, or a security operation start time as a length of time passed subsequent to sunset, an end time setting unit for setting an end time of the specific time period, or a security operation end time, as a length of time passed subsequent to sunset, and an elapsed time measuring unit for measuring a length of time passed from sunset. According to this preferred feature, when the length of elapsed time measured attains the start time defined by the length of time passed subsequent to sunset, the security operation starts. Accordingly, the specific time period for the security operation can be determined in dependence on change of the hour of sunset dependent on the season and/or the geographic conditions in which a house is built and, therefore, the timing at which the alert is issued can be further easily and properly optimized.

In a preferred embodiment, the time period setting device includes a sunset detecting unit for detecting sunset, a sunrise detecting unit for detecting sunrise, a start time setting unit for calculating a start time of the specific time period to a midtime by calculating such midtime between sunset and sunrise, an end time setting unit for setting an end time of the specific time period as a length of time passed subsequent to the midtime, and an elapsed time measuring unit for measuring a length of time passed from midtime. According to this preferred feature, since the specific time period starts at the start time set to be the midtime between sunset and sunrise, the specific time period for the security guard can be accurately defined to suit the change of the hour of sunset depending on the season and the geographic conditions of the house. Therefore, the timing at which the security operation starts can be further easily and properly set. Also, since the security operation is terminated when the measured length of elapsed time comes to be equal to the end time so set, an end timing of the security operation can easily be optimized.

In another preferred embodiment, the time period setting device may include a sunset detecting unit for detecting sunset, a sunrise detecting unit for detecting sunrise, a past data accumulating unit for accumulating a predetermined number of past sunset/sunrise hours, a start time setting unit for a start time of the specific time period to a midtime by calculating such midtime between sunset and sunrise, which is averaged from the sunset/sunrise hours contained in the past data, an end time setting unit for setting an end time of the specific time period as a length of time passed from the midtime, and an elapsed time measuring unit for measuring a length of time passed from the start time to the end time. According to this preferred feature, at the start time, which is the midtime, calculated based on the accumulated past data, the timing at which the security of operation is initiated can be automatically optimized.

Preferably, the time period setting device may include a clock for clocking, a start time setting unit for setting a start time of the specific time period, and an end time setting unit for setting an end time of the specific time period. According to this preferred feature, after the time clocked by the clock reaches the start time and when the human body is subsequently detected by the human body detector, the alert or threatening is initiated. Accordingly, the timing at which the alert is initiated can be easily and properly set with a simple structure.

In the security lighting apparatus according to a still further preferred embodiment of the present invention, the time period setting device includes a home return determining unit for determining a return of a house resident back to a house, a start time setting unit for setting a start time of the specific time period as a confirmation hour at which it has been confirmed that all of house residents returned home, an end time setting unit for setting an end time of the specific time period, as a length of time passed from the confirmation hour, and an elapsed time measuring unit for measuring a length time passed from the confirmation hour, and an elapsed time measuring unit for measuring a length time passed from the confirmation hour. According to this preferred feature, the alert can be initiated when the human body is detected by the human body detector when and after return of all of the family members expected to return home has been confirmed and, accordingly, the timing at which the alert is initiated can be automatically optimized without allowing any of the family members to feel unpleasant.

Preferably, the security lighting apparatus according to the present invention may additionally include at least a camera for taking a picture of the detection area when illuminating light from the illuminator blinks, so that a picture of an intruder entering the detection area can be photographed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, various preferred embodiments of the present invention will be described with reference to the accompanying drawings.

Figure 1:
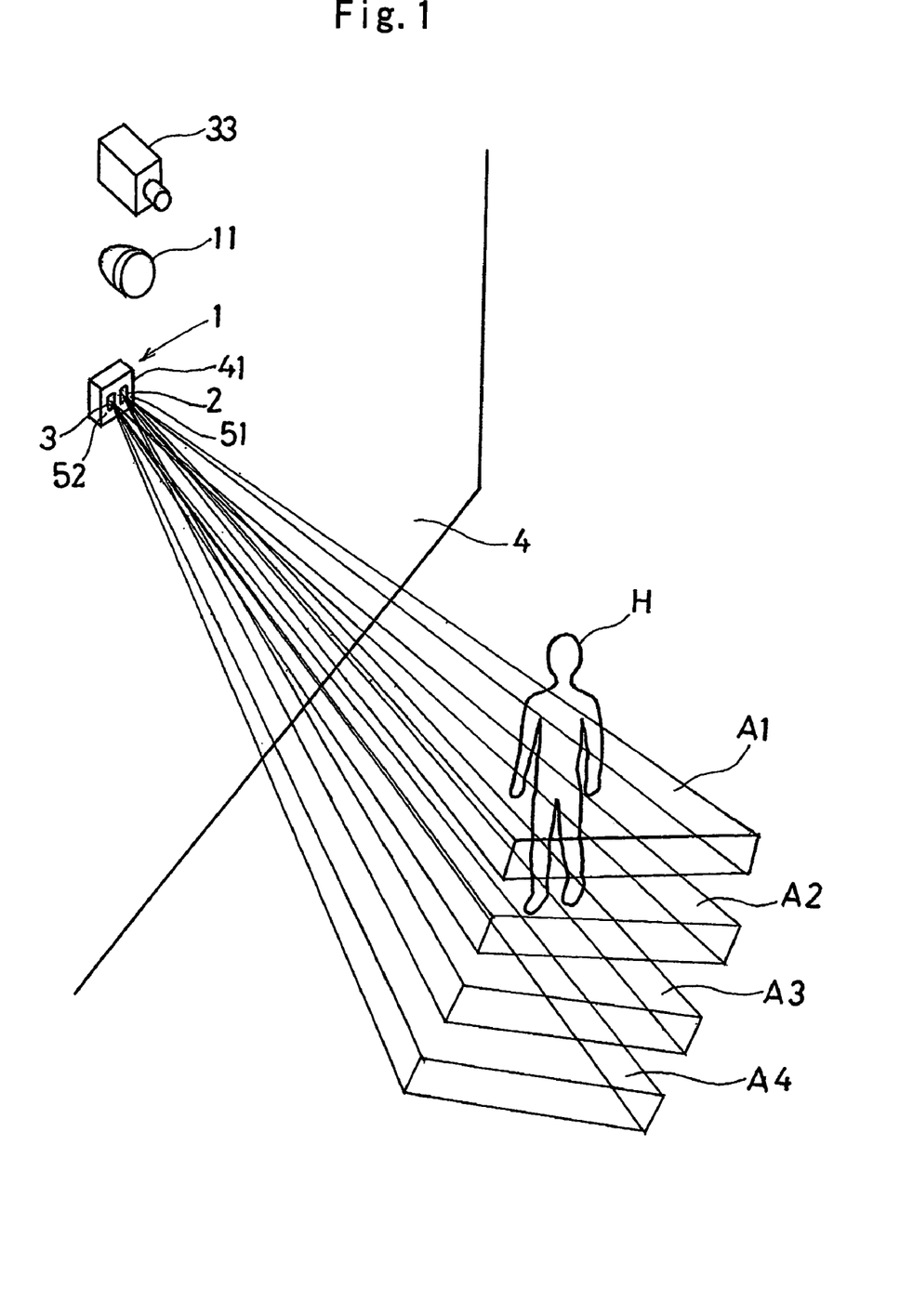
FIG. 1 is a schematic perspective view of an optical arrangement, in which a security lighting apparatus according to a first preferred embodiment of the present invention is disposed.

Referring first to FIG. 1, there is shown an optical arrangement showing the environment, in which the security lighting apparatus according to a first preferred embodiment of the present invention is disposed. The security lighting apparatus shown therein is of a type fixed to an outer wall surface of a building such as, for example, a dwelling house or a factory for detecting an intruder illegally entering one of a plurality of detection periods A1, A2, A3 and A4 defined in the outdoor area of the building. This security lighting apparatus includes a human body detector 1 and an illuminator 11 for illuminating the detection periods A1 to A4.

The human body detector 1 is of, for example, a passive type infrared beam (PIR) system and includes a pair of infrared detecting elements 2 and 3, each in the form of a pyroelectric element, housed within a casing 41. This human body detector 1 is, when in use, fixed to an outer wall surface 4 of, for example, a building. The detection periods A1 to A4, which are aimed at by the infrared detecting elements 2 and 3, are determined by optical systems 51 and 52 such as, for example, Fresnel lenses fixedly mounted on the casing 41 in alignment with the respective infrared detecting elements 2 and 3 within the casing 41. As is well known to those skilled in the art, infrared energies emanating from a human body H appearing within any one of the detection periods A1 to A4 are, after having been collected by the optical systems 51 and 52, captured by the associated infrared detecting elements 2 and 3 to eventually determine the presence of the human body H within any one of the detection periods A1 to A4. The human body H referred to above may be an intruder entering into any one of the detection periods A1 to A4.

The illuminator 11 may include, for example, a halogen lamp or a high voltage discharge lamp, and in the event that the human body detector 1 detects the presence of the human body H within any one of the detection periods A1 to A4, the illuminator 11 can be continuously turned on to illuminate the detection periods A1 to A4 for a predetermined length of time, but can blink (or flash) for alert purpose if the human body H so detected is an intruder at night. In the illustrated embodiment, the alert is accomplished by the flashing light emitted by the illuminator 11.

Figure 2:
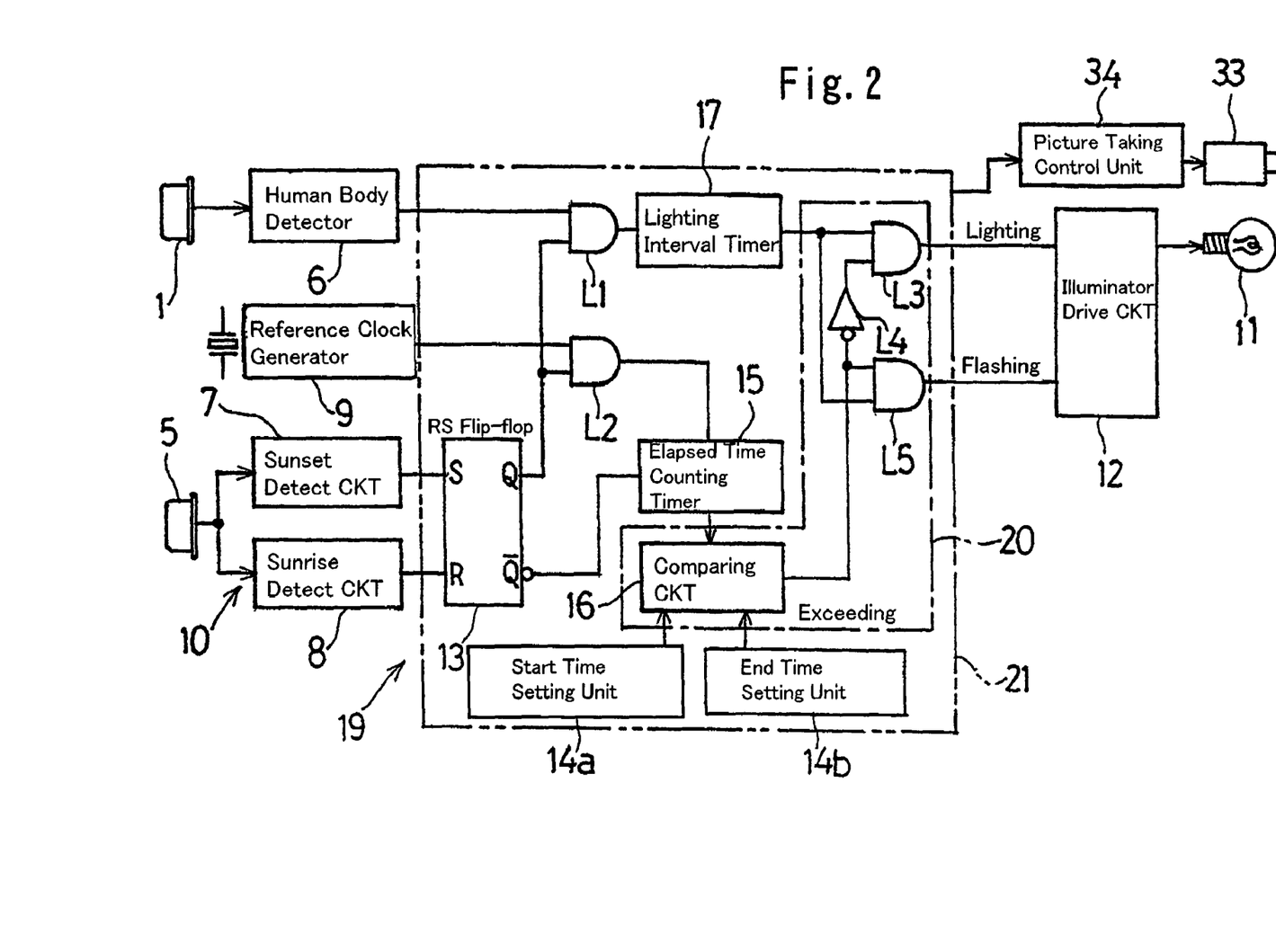
FIG. 2 is a circuit block diagram showing an electric circuit employed in the security lighting apparatus of FIG. 1.

FIG. 2 illustrates a circuit block diagram showing an electric circuit employed in the security lighting apparatus of the present invention. As shown therein, the security lighting apparatus includes an alert time period setting device 19 for setting a specific time period for security operation, i.e., the period of a day during which the security check must be made in a manner as will be become clear from the subsequent description. In the illustrated embodiment, the alert time period referred to above is set to the time span in the night between the hour of each day after passage of a predetermined length of time subsequent to sunset to the hour of sunrise in the next morning. This alert time period setting device 19 includes a light meter 5 for measuring the ambient brightness, a human body detecting circuit 6 for processing detection pulse signals, fed from the infrared detecting elements 2 and 3, and outputting a human body detection signal, and a night determining unit 10. The night determining unit 10 in turn includes a sunset detecting circuit 7 for detecting sunset, a sunrise detecting circuit 8 for detecting sunrise and is operable to determine the nighttime in reference to respective signals indicative of sunset and sunrise fed from the sunset and sunrise detecting circuits 7 and 8.

The light meter 5 and the sunset detecting circuit 7 altogether constitute a sunset detecting unit, while the light meter 5 and the sunrise detecting circuit 8 altogether constitute a sunrise detecting unit.

The light meter 5 referred to above may be in the form of, for example, photoconductive sensor and is of a type capable of detecting only a sluggish change in ambient brightness, but incapable of detecting, for avoiding a false determination, an abrupt change in ambient brightness such as brought about by illumination by automobile headlights in the nighttime, lightning in the daytime or the like.

The security lighting apparatus of the present invention also includes an illuminator drive circuit 12 for driving the illuminator 11 when the human body is detected by the human body detector 1 during the specific time period in the nighttime, which is determined by the night determining unit 10.

The alert time period setting device 19 referred to above includes a start time setting unit 14a for setting the start time of the specific time period, at which the alert or threatening by means of flashing can be initiated, as the length of time passed subsequent to sunset detected by the night determining unit 10, and an end time setting unit 14b for setting the end time of specific time period, at which the alert can be terminated, as the hour of sunrise detected by the sunrise detecting unit. By allowing the user of the security lighting apparatus to input the start time to the start time setting unit 14a, the start timing, at which the flashing can be triggered on, can be set as desired.

The alert time period setting device 19 also includes an elapsed time measuring unit 15, which may be in the form of an elapsed time counting timer capable of measuring the length of time passed subsequent to sunset, and a comparing circuit 16 for comparing the counted length of elapsed time with the start time or the end time. An illuminator control circuit 20 is operable to activate the illuminator drive circuit 12, when the measured length of elapsed time attains the preset start time and inactivates the illuminator drive circuit 12 at the end time. The start time setting unit 14a, the end time setting unit 14b, the elapsed time counting means 15, the comparing circuit 16 and the illuminator control circuit 20 are all incorporated in a control device 21 for controlling the security lighting apparatus as a whole.

The control device 21 additionally includes a reference clock generating circuit 9, and a lighting interval timer 17 for counting the length of time subsequent to the detection of the human body by the human body detecting circuit 6 and the detection of sunset by the sunset detecting circuit 7. An RS flip-fop 13, logic circuits L1 to L5 and others are also included in the control device 21.

The security lighting apparatus of the present invention furthermore includes a camera 33 for taking pictures of the detection periods A1 to A4 when the flashing is triggered on by the illuminator drive circuit 12, and a picture taking control unit 34 for activating the camera 33.

The sequence of control performed by the illuminator control circuit 20 of the security lighting apparatus of the structure hereinabove described will now be described with particular reference to the timing chart shown in FIG. 3.

Assuming that the sunset detecting circuit 7 detects sunset at a timing t1 shown by (a) in FIG. 3, an high level signal is generated from a Q output of the RS flip-flop 13 and is subsequently supplied to AND circuits L1 and L2. Then, the AND circuit L1, to which a reference clock signal from the reference clock generating circuit 9 is supplied, outputs an high level signal which is in turn supplied to the elapsed time counting timer 15 to cause the latter to count the length of time passed subsequent to the timing t1 of sunset. At the timing (security operation start timing) t2, at which the count of the elapsed time counting timer 15 attains a value corresponding to the predetermined start time T2, the comparing circuit 16 outputs an high level signal.

By way of example, assuming that the start time T2 is set to 7 hours during the winter season and 5 hours during the summer season, the alert start timing t2 will be generally zero o'clock a.m. On the other hand, if an high level signal (human body detection signal shown by (b) in FIG. 3) indicative of the detection of a human body is inputted to an AND circuit L1 to which the high level signal (sunset detection signal) indicative of the detection of sunset is inputted, the lighting timer 17 starts its counting operation. When during the period in which the lighting interval timer 17 undergoes the counting indicating the detection of the human body and the detection of sunset, the high level signal from the comparing circuit 16 is supplied to an AND circuit L5, a flashing signal is outputted from the AND circuit L5 to the illuminator drive circuit 12 to activate it, thereby causing the illuminator 11 to emit a flashing aiming at the detection periods A1 to A4 for alert purpose (as shown by (c) in FIG. 3). In this way, the flashing is carried out during the particular length of time between the timing t2 to the timing t3.

On the other hand, up until the start time T2, which is the measured length of elapsed time subsequent to the detection of sunset at the timing t1, the low signal is outputted from the comparing circuit 16 and is converted into a high level signal by a NOT circuit L4. When he high level signal from the NOT circuit L4 is inputted to the AND circuit L3 during the period in which the lighting interval timer 17 undergoes the counting indicating the detection of the human body and the detection of sunset, a continuous lighting signal is outputted from the AND circuit L3 to the illuminator drive circuit 12 to activate the latter so that for a predetermined length of time, for example, 60 seconds, the illuminator 11 continuously illuminates the detection periods A1 to A4 as shown by (c) in FIG. 3, to provide illumination for the returning house residents.

Figure 3:
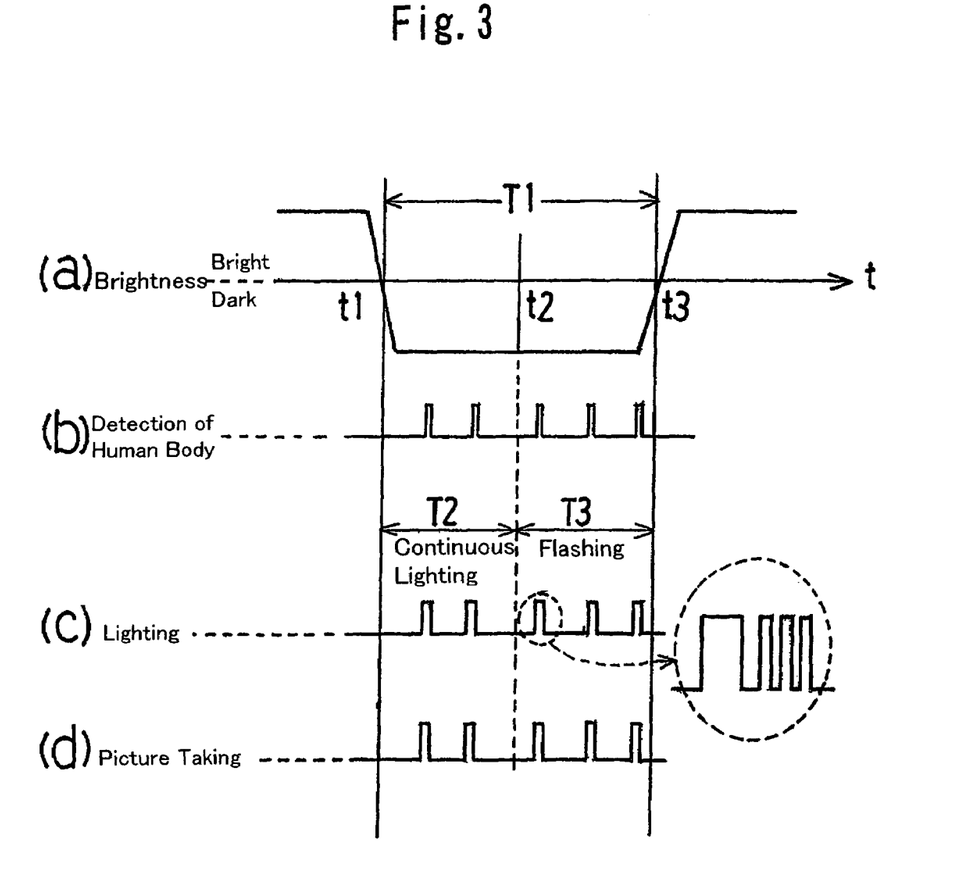
FIG. 3 is a timing chart showing various waveforms of signals in the electric circuit of the security lighting device.

When the sunrise detecting circuit 8 detects sunrise at a timing t3 (shown by (a) in FIG. 3), a high level signal (the sunrise detection signal indicative of sunrise) is supplied from an inverted Q output of the RS flip-flop 13 to the elapsed time counting timer 15 and, also, an low signal is supplied from the Q output of the RS flip-flop 13 to the AND circuit L1. Then, the elapsed time counting timer 15 is reset with the counting halted consequently and, at the same time, the lighting interval timer 17 is reset with the counting halted consequently. Accordingly, the time period for alert purpose is terminated upon sunrise.

The period from the timing (sunset) t1 to the timing t3 (sunrise) is the nighttime T1 and the interval T3 from the timing t2 (the start time) to the timing t3 (sunrise) is the specific time period in the nighttime T1. See (a) in FIG. 3. It is to be noted that the end time setting unit 14*b* referred hereinabove may be so designed as to set the length of time elapsed subsequent to sunset, not to set the timing of detection of sunrise as the end time of the specific time period.

In this way, during the nighttime T1, continuous lighting for the returning house residents can take place during the interval T2 from the timing t1 of sunset to the start time t2 and flashing for alert or threatening can take place during the interval T3 from the start time T2 to the timing T3 of sunrise. See (c) in FIG. 3.

Also, the control device 21 is operable to instruct the picture taking control unit 34 to activate the camera 33, as shown by (d) in FIG. 3, so that when the flashing is carried out by the illuminator drive circuit 12, the detection periods A1 to A4 (See FIG. 1.) can be photographed. By way of example, a plurality of still pictures can be taken. In such case, a first part of the flashing may be a continuous lighting for picture taking purpose by means of the camera 33 as shown in an enlarged portion of (c) in FIG. 3. Where no picture taking is carried out, the flashing takes place for the entire predetermined length of time.

It is to be noted that not only when the flashing takes place, but also when the continuous lighting takes place, the picture taking with the camera 33 may be carried out.

As hereinabove described, in the illustrated embodiment, the security operation during which flashing can take place starts when the measured length of elapsed time attains a value equal to the start time and, accordingly, the timing at which the flashing starts for alert purpose can easily and properly set. In addition, by the detection of sunset and sunrise, the timing at which the continuous lighting starts subsequent to sunset and the timing at which the flashing terminates prior to sunrise can also easily and properly set.

It is, however, to be noted that although in the illustrated embodiment as an alert device the alert is carried out by means of the illuminator 11, the use may be made of a sound source in combination with a loudspeaker so that the alert can be done by means of alert or threatening sounds and/or the flashing with the illuminator 11 may be combined with the alert sounds to accomplish the intended alert.

Hereinafter, a second preferred embodiment of the present invention will be described. Unlike the previously described first embodiment, this second embodiment is such that in place of the measurement of the length of time elapsed subsequent to sunset, arrangement is made to initiate the flashing when the counting of a clock (calendar) reaches the start time.

Figure 4:
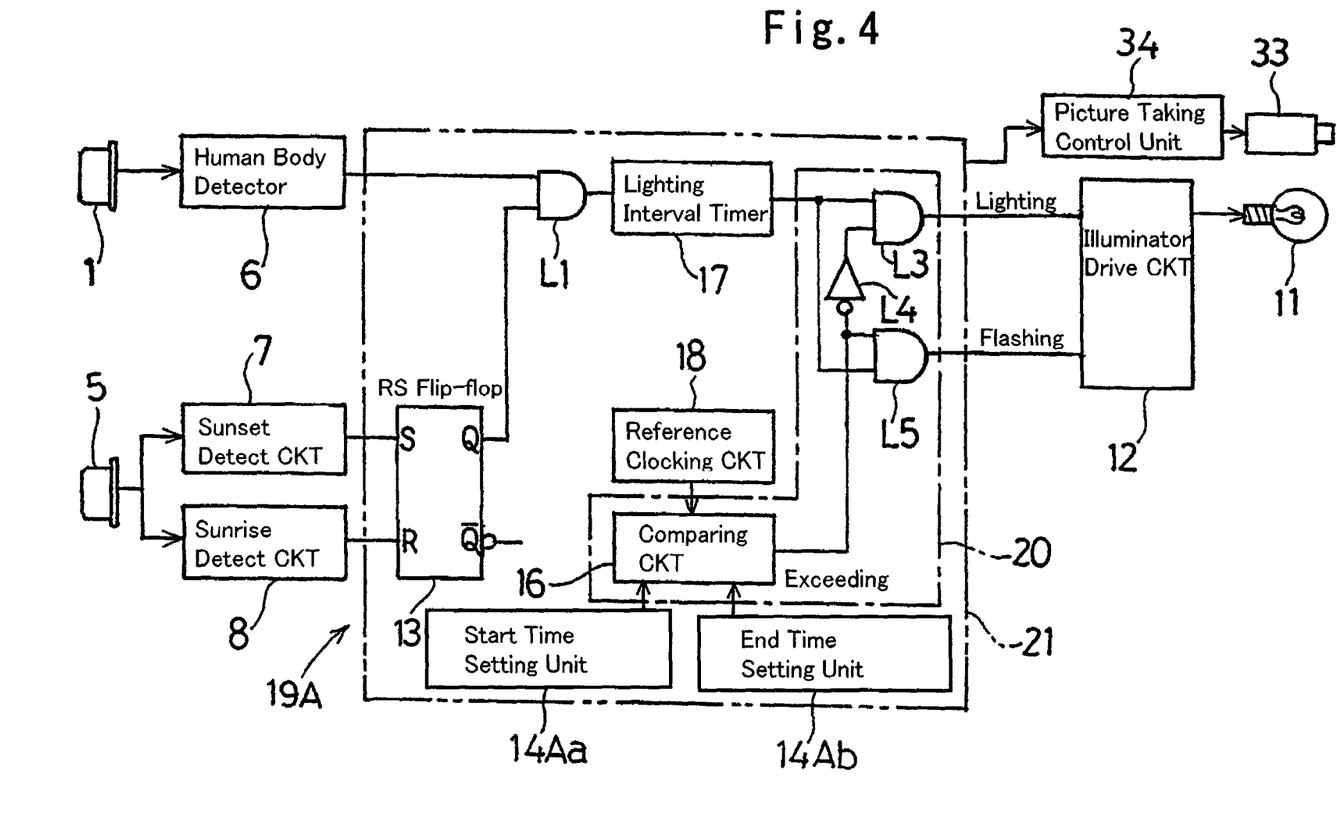
FIG. 4 is a circuit block diagram showing an electric circuit employed in the security lighting apparatus according to a second preferred embodiment of the present invention.

More specifically, as shown in FIG. 4, the security lighting apparatus according to the second embodiment includes a reference, clocking circuit 18 capable of functioning as a clock for clocking, a start time setting unit 14Aa for setting a start time of the specific time period during which the flashing can start, an end time setting unit 14Ab for setting an end time of the specific time period, a comparing circuit 16 for comparing the clocking of the clock circuit 18 with the start time or the end time. The illuminator control circuit 20 activates the illuminator drive circuit 12 when the human body is detected by the human body detector 1 when the clocking of the clock attains the start time. The start time may be set to, for example, zero o'clock a.m. by the start time setting unit 14Aa. The start time setting unit 14Aa, the end time setting unit 14Ab, the clock 18, the comparing circuit 16 and the illuminator control circuit 20 are all incorporated in the control device 21 for controlling the security lighting apparatus as a whole.

Other structural features of the security lighting apparatus according to the second embodiment than those described above are similar to those shown in and described in connection with the previously described first embodiment and, therefore, the details thereof are not reiterated for the sake of brevity.

The clock 18 is preferably employed in the form of a quartz oscillating circuit, a clock radio receiving circuit capable of receiving a clock radio wave generated on the basis of an atomic clock, an electric power frequency counting circuit capable of counting "1/frequency" as one second based on the frequency of an electric power generator, or an electric power frequency determining circuit capable of determining whether the electric current of an electric power generator is 50 cycles per second or 60 cycles per second, or any other clock circuit capable of accurately counting the length of time.

The security lighting apparatus according to the second embodiment is so designed that when the clocking performed by the clock 18 attains the start time, the illuminator control circuit 20 causes the illuminator drive circuit 12 to activate so that the flashing can take place by means of the illuminator 11 in the event of the human body detected by the human body detector 1. When the clocking performed by the clock 18 attains the end time, the flashing terminates. Accordingly, with a simple structure, the timing at which the flashing is performed for alert purpose and the timing at which the flashing is terminated can be properly set.

Figure 5:
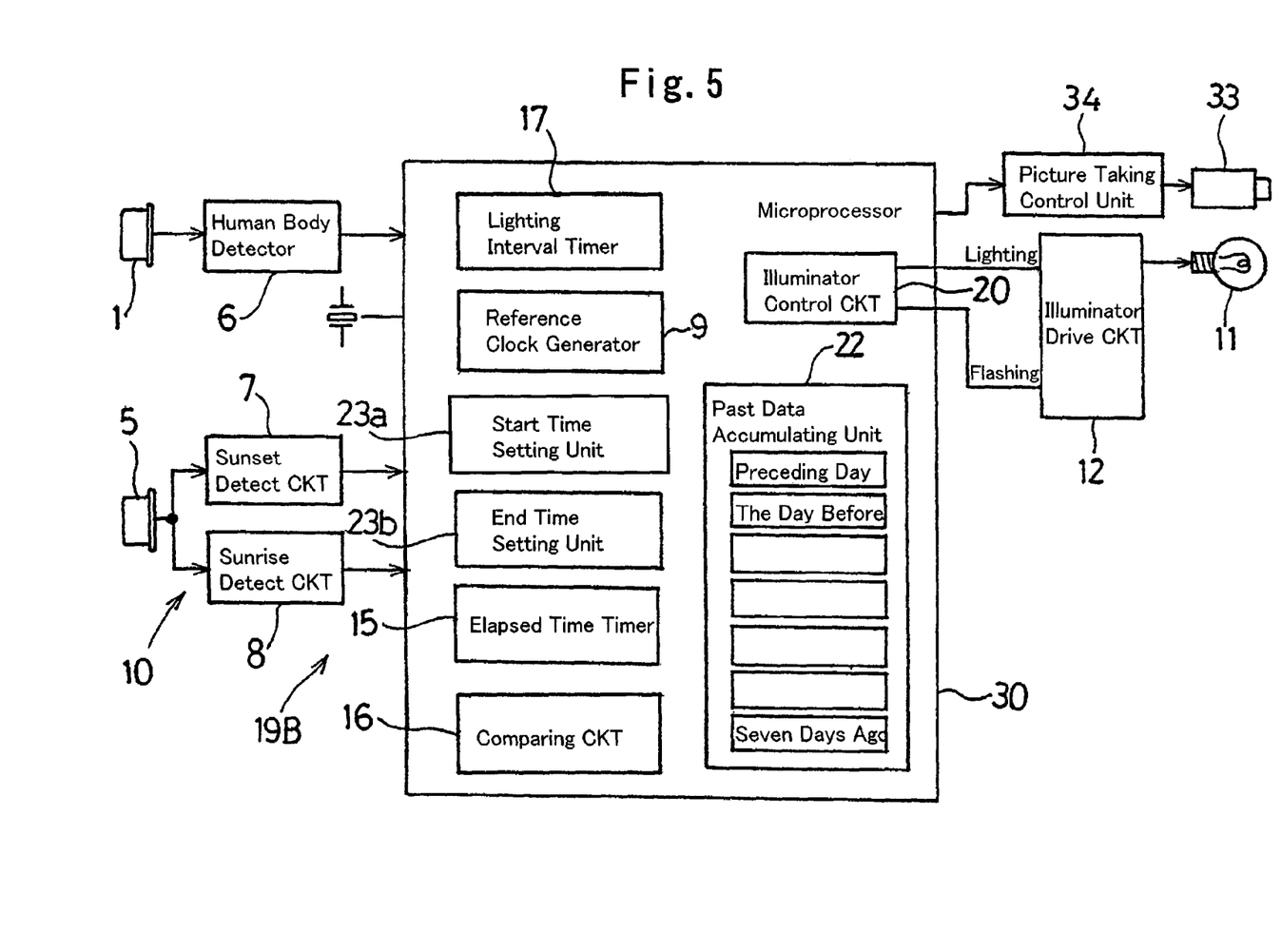
FIG. 5 is a circuit block diagram showing the electric circuit employed in the security lighting apparatus according to a third preferred embodiment of the present invention.

FIG. 5 illustrates a circuit block diagram of the electric circuit employed in the security lighting apparatus according to a third preferred embodiment of the present invention, which will now be described. Unlike the previously described first embodiment, the third embodiment is such that in place of the setting of the start time of the specific time period by inputting such start time, the timing at which the specific operation starts can be automatically optimized by calculating and setting the midnight hour (midtime).

More specifically, as shown in FIG. 5, the security lighting apparatus according to this third embodiment includes a time period setting device 19B. This time period setting device 19B in turn includes a past data accumulating unit 22 for accumulating a predetermined number of results of determination of the sunset/sunrise hours done by the night determining unit 10 in the past, a start time setting unit 23*a* for calculating a midtime from sunset to sunrise, which is averaged from the past data on the sunset/sunrise hours, and to set the start time of the specific time period during which the alert is initiated, to the later hour (midtime), an end time setting unit 23b for setting the end time of the specific time period, as the length of time from the midtime, and a comparing circuit 16 for comparing the length of elapsed time from sunset and from the midtime, measured by the elapsed time measuring timer 15, with the calculated midtime and the length of time from the midtime.

The illuminator control circuit 20 is operable to activate the illuminator drive circuit 12 upon arrival at the preset midtime and to inactivate the illuminator drive circuit 12 upon passage of the length of time elapsed from the midtime. The past data accumulating unit 22, the start time setting unit 23a, the end time setting unit 23b, the elapsed time measuring timer 15, the comparing circuit 16 and the illuminator control circuit 20 are all incorporated in the control device 30 which may be a microprocessor for controlling the security lighting apparatus as a whole.

Other structural features of the security lighting apparatus according to the third embodiment than those described above are similar to those shown in and described in connection with the previously described first embodiment and, therefore, the details thereof are not reiterated for the sake of brevity.

In this security lighting apparatus shown in and described with reference to FIG. 5, the past data accumulating unit 22 accumulates data on the nighttime T1 based on the sunset/sunrise hours during a period starting from, for example, the preceding day to seven days ago, and the start time setting unit 23a calculates, for example, 50% or 60% of the average time of the accumulated data on the nighttime T1 to define the midnight hour (midtime) t2 (as shown by (a) in FIG. 3). It is, however, to be noted that the hour of the day, which is one hour after or before the 50% of the average time, may be set as the midnight hour. By so doing, the illuminator control circuit 20 causes the illuminator drive circuit 12 after the timing coinciding the midnight hour (midtime) t2 so defined, to be activated so that the illuminator 11 can flash when the human body is detected. The specific time period during which the flashing can take place terminates when the length of time elapsed from the midnight hour (midtime) t2 attains the end time.

Thus, based on the midnight hour defined by the accumulated past data, the timing at which the flashing for alert purpose takes place when the human body is detected by the human body detector 1 or the timing at which the flashing for alert purpose terminates, can be automatically optimized.

Although in the foregoing embodiment shown in and described with reference to FIG. 5, the past data accumulating unit 22 has been described as accumulating the sunset/sunrise hours for the predetermined past period so that the midtime can be calculated from the average value of the past sunset/sunrise hours, this may be dispensed with and, instead, the midtime between sunset and sunrise may be calculated based on data on the previous day so that such midtime can be set as the start time of the specific time period for the security operation.

Figure 6:
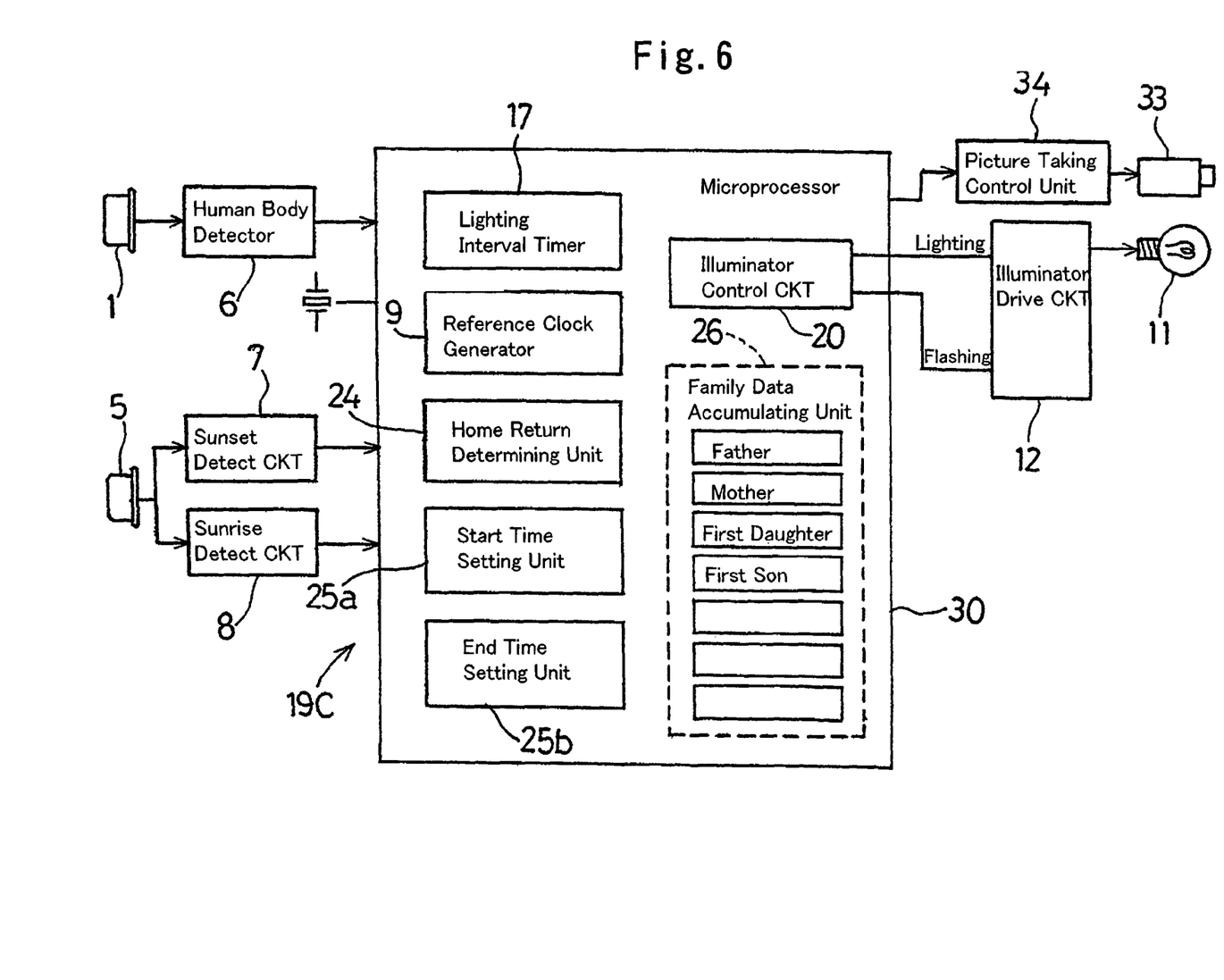
FIG. 6 is a circuit block diagram showing an electric circuit employed in the security lighting apparatus according to a fourth preferred embodiment of the present invention.

FIG. 6 illustrates a circuit block diagram of the electric circuit employed in the security lighting apparatus according to a fourth preferred embodiment of the present invention, which will now be described. Unlike the previously described first embodiment, the fourth embodiment is such that in place of the setting of the start time by inputting such start time, the timing at which the security operation starts can be automatically set by confirming that all members of the family have returned home.

More specifically, as shown in FIG. 6, the security lighting apparatus includes a time period setting device 19C, which in turn includes a home return determining unit 24 for determining a home return of a house resident, a start time setting unit 25a for setting the hour, on which it has been confirmed that all of the family members due to return home returned home, as the start time of the specific time period for security operation during which the flashing can be carried out and an end time setting unit 25b for setting a predetermined length of time after the hour of confirmation of return of the family members, as the end time of the specific time penod.

The illuminator control circuit 20 is operable to activate the illuminator drive circuit 12, when the human body is detected by the human body detector 1 after return of all of the house residents, for example, family members to their house has been confirmed by the start time setting unit 25a, and to inactivate the illuminator drive circuit 12 upon passage of a predetermined length of time subsequent to the hour of confirmation of the return of the family members. The home return determining unit 24, the start time setting unit 25a, the end time setting unit 25b and the illuminator control circuit 20 are all incorporated in the control device 30 which may be a microprocessor for controlling the security lighting apparatus as a whole.

Other structural features of the security lighting apparatus according to the fourth embodiment than those described above are similar to those shown in and described in connection with the previously described first embodiment and, therefore, the details thereof are not reiterated for the sake of brevity.

The home return determining unit 24 detects the return of each of the family members to their house on a non-contact basis by means of an ID input device when an ID card, for example, assigned to each of those family members is inputted in the ID input device. The start time setting unit 25a confirms the return of all of the family members expected to return home, by detecting, for example, the return of all of the family members by means of the respective ID cards, detecting a chain lock having latched after all of the family members have returned home, or utilizing the history of a mobile call made by one of the family members who returns home last.

The security lighting apparatus according to the fourth embodiment is such that the home return determining unit 24 detects the return of each of the family members to their house and the start time setting unit 25a ascertains the return of all of the family members expected to return home. After the return of all of the family members to their house has been confirmed, the illuminator drive circuit 12 can be activated by the illuminator control circuit 20 to cause the illuminator 11 to flash. In this way, after the return of all of the family members has been confirmed and when the human body is subsequently detected by the human body detector 1, the flashing takes place. Accordingly, the timing at which the flashing takes place for alert purpose and the timing at which the flashing terminates can be automatically optimized.

It is to be noted that a family data accumulating unit 26 for accumulating on data representative of recent home returning times of the family members may be employed to enable the hour of the day, by which all of the family members return home from outing, to be calculated so that the calculated hour of the day can be used to confirm that all of the family members have returned home from outing.

Although in any one of the foregoing embodiments, the time period of each day, during which the security lighting apparatus is activated for security guard, has been determined as a specific period in the nighttime, the time period may be a specific period during the daytime other than the nighttime particularly where the security lighting apparatus is used in, for example, a relatively dark area within the building.

Also, although in any one of the foregoing embodiment the use of the camera 34 and the picture taking control unit 33 has been made, they may not be always essential in the practice of the present invention and may be dispensed with if so desired.

It is also to be noted that in any one of the foregoing embodiments the human body detector 1 has been shown and described as being of the passive type infrared beam (PIR) system, the human body detector 1 may be of an AIR system capable of detecting an object by projecting near infrared rays of light as a detection wave and detecting a portion of the near infrared rays of light reflected from such object. Alternatively, an active type ultrasonic or radio sensor made up of a transmitting element capable of transmitting ultrasonic waves or radio waves as a detection wave and a receiving element capable of receiving a portion of the ultrasonic or radio waves reflected from an object to be detected can also be employed for the human body detector 1. Yet, the detection of a human body can be accomplished by the use of a switch operatively associated with detection of disturbed radio waves or with selective closure and opening of a physical shielding means for dividing the area into inner and outer periods.

As hereinbefore fully described, according to the present invention, when the human body is detected by the human body detector during the time period specified by the time period setting device, alert can be issued to an intruder entering the detection area and, therefore, the timing at which the alert is issued can easily and properly be set by the setting of the specific time period during which a security check must be made.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A security lighting apparatus, which comprises:
   a human body detector for detecting a human body within a detection area;
   an illuminator for illuminating the detection area when a human body is detected;
   a time period setting device for setting a specific time period during which a security check must be made; and
   an alert device operable, when the human body is detected within the detection area during the specific time period, to issue an alert to an intruder entering the detection area, wherein the time period setting device comprises:
   a sunset detecting unit for detecting sunset;
   a start time setting unit for setting a start time of the specific time period as a length of time passed subsequent to sunset;
   an end time setting unit for setting an end time of the specific time period as a length of time passed subsequent to sunset: and
   an elapsed time measuring unit for measuring a length of time passed from sunset.

2. The security lighting apparatus as claimed in claim 1, wherein the alert device issues the alert by repeatedly turning the illuminator on and off.

3. The security lighting apparatus as claimed in claim 1, wherein the alert device issues the alert in the form of sounds or in the form of a combination of blinking of the illuminator and sounds.

4. The security lighting apparatus as claimed in claim 1, wherein the time period setting device comprises:
   a clock for clocking;
   a start time setting unit for setting a start time of the specific time period; and
   an end time setting unit for setting an end time of the specific time period.

5. A security lighting apparatus, which comprises:
   a human body detector for detecting a human body within a detection area;
   an illuminator for illuminating the detection area when a human body is detected;
   a time period setting device for setting a specific time period during which a security check must be made; and
   an alert device operable, when the human body is detected within the detection area during the specific time period, to issue an alert to an intruder entering the detection area, wherein the time period setting device comprises:
   a sunset detecting unit for detecting sunset;
   a sunrise detecting unit for detecting sunrise;
   a start time setting unit for calculating a start time of the specific time period to a midtime by calculating such midtime between sunset and sunrise;
   an end time setting unit for setting an end time of the specific time period as a length of time passed subsequent to the midtime; and
   an elapsed time measuring unit for measuring a length of time passed from the midtime.

6. A security lighting apparatus, which comprises:
   a human body detector for detecting a human body within a detection area;
   an illuminator for illuminating the detection area when a human body is detected;
   a time period setting device for setting a specific time period during which a security check must be made; and
   an alert device operable, when the human body is detected within the detection area during the specific time period, to issue an alert to an intruder entering the detection area, wherein the time period setting device comprises:
   a sunset detecting unit for detecting sunset;
   a sunrise detecting unit for detecting sunrise;
   a past data accumulating unit for accumulating a predetermined number of past sunset/sunrise hours;
   a start time setting unit for a start time of the specific time period to a midtime by calculating such midtime between sunset and sunrise, which is averaged from the sunset/sunrise hours contained in the past data;
   an end time setting unit for setting an end time of the specific time period as a length of time passed from the midtime; and
   an elapsed time measuring unit for measuring a length of time passed from the midtime.

7. The security lighting apparatus as claimed in claim 1, further comprising at least a camera for taking a picture of the detection area when illuminating light from the illuminator blinks.

* * * * *